Figure 1:
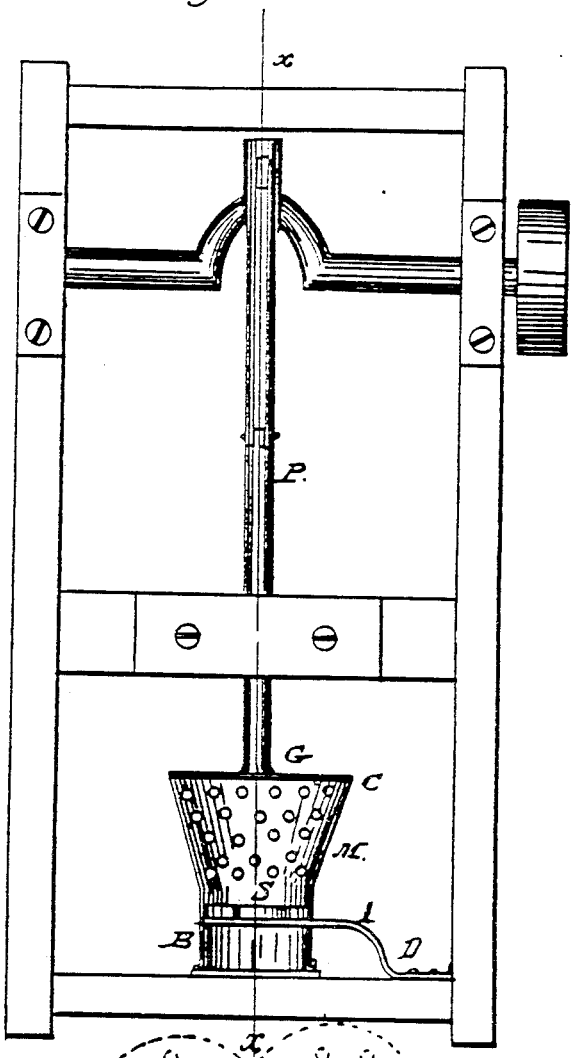
Figure 2:
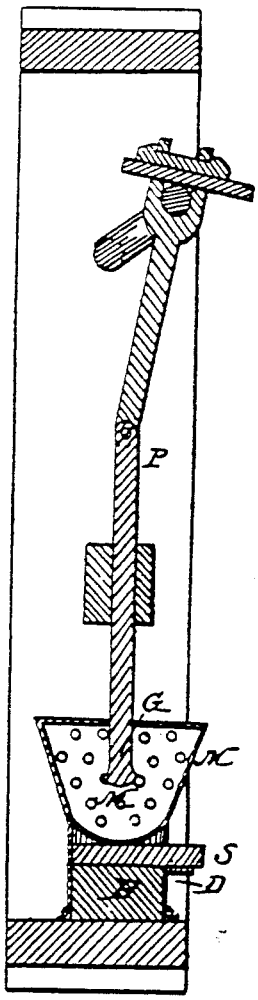
Figure 3:
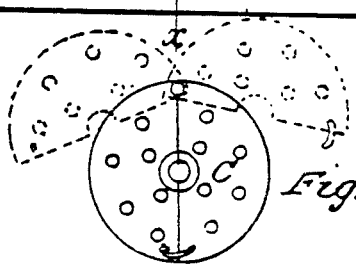
Figure 4:
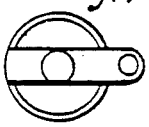

BEST AVAILABLE COPY

J. KEEZER.

Hominy Machine.

No. 216.

A. I. Patented Jan'y 18, 1859.